Dec. 6, 1960  E. MEILI ET AL  2,963,600
DEVICE FOR THE DETERMINATION OF CHANGES
IN THE COMPOSITION OF GAS
Filed July 11, 1958  2 Sheets-Sheet 1

INVENTORS:
Ernst Meili
Thomas Lampart
Heinrich Dorfler
BY
Patent Agent

Dec. 6, 1960 E. MEILI ET AL 2,963,600
DEVICE FOR THE DETERMINATION OF CHANGES
IN THE COMPOSITION OF GAS
Filed July 11, 1958 2 Sheets-Sheet 2

INVENTORS
Ernst Meili
Thomas Lampart
BY Heinrich Derfler

United States Patent Office 2,963,600
Patented Dec. 6, 1960

2,963,600

DEVICE FOR THE DETERMINATION OF CHANGES IN THE COMPOSITION OF GAS

Ernst Meili, Kusnacht, Zurich, and Thomas Lampart and Heinrich Derfler, Bad Ragaz, Switzerland, assignors to Cerberus G.m.b.H., Bad Ragaz, Switzerland, a company of Switzerland Filed July 11, 1958, Ser. No. 748,051

Claims priority, application Switzerland Oct. 30, 1957

6 Claims. (Cl. 313—1)

The present invention relates to a device for the determination of changes in the composition of a gas and more particularly to a fire alarm measuring the content of aerosols present in air due to a combustion process.

Fire alarms of this type are known in the art. In the known alarms the center point in the connection between two series-connected ionization chambers each provided with at least one radioactive preparation is connected to the control electrode of a relay tube. While one ionization chamber is largely enclosed, the other is open to the atmosphere so that a change in the composition of the air will cause an alteration of the potential in the control electrode of the relay tube, the relay tube on the one hand being mounted in a base and, on the other, carrying an electrode corresponding to the electric center point between the two chambers.

Devices of this type operate with great sensitivity and reliability. The very low flowing currents, however, require an extremely efficient insulation of the electric central point between the two ionization chambers. In order to eliminate superfluous insulation means, it is therefore advantageous for the control electrode to be led out separately at one end of the tube and for this tube end also to be employed in the mechanical structure of the corresponding portions of the ionization chambers. Attachment of the electrodes of the ionization chambers to the tube has so far not been satisfactory since neither mechanical clamping nor bonding provides a permanently reliable connection between the tube and the structure.

It is therefor a primary object of the present invention to provide a device for the determination of changes in the composition of gas, in which the members conducting the testing current and the testing potential are efficiently insulated from and reliably connected to the parts carrying these members.

It is further an object of the present invention to provide in a device for the determination of changes in the composition of gas a reliable and safe connection between the glass body of a relay tube and the members conducting the testing current and the testing potential, while these members efficiently are insulated from the structure.

According to one aspect of the present invention, this is achieved in the device described above by closing the relay tube on the side of the ionization chamber by means of a metal disk from which the control electrode projects into the interior of the tube and to which the electrode of the ionization chamber is attached.

Other objects and features of the present invention will become apparent from the following description, taken in conjunction with the attached drawings in which.

Figure 1:
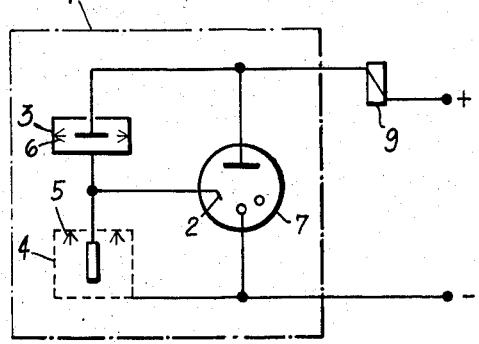
Fig. 1 is a circuit diagram showing the operation of the device.

The device represented in Fig. 1 for the determination of the change in the composition of a gas, by way of example a fire alarm 1, comprises two ionization chambers 3 and 4 in which a radium preparation 5 and 6 respectively is provided. Chamber 3 is enclosed, i.e. not directly accessible to outside air, while chamber 4, as shown, is provided with perforations so that the air can enter. Both chambers are series-connected, the end terminals being connected to a voltage source. The center point in the connection between the two chambers is connected to a control electrode 2 of a cold cathode or relay tube 7 which is also connected to the voltage source. When the cold cathode tube 7 responds, a relay 9 arranged in the voltage supply line will pull up. This relay 9 in turn controls, by way of example, a signaling device.

The ionization chambers 3 and 4 are so dimensioned that, when the composition of the air is normal, the potential at the center point between the chambers will not suffice to ignite the cold cathode tube 7. However, if smoke particles enter the chamber 4 through the perforations, the current flowing through this chamber will be reduced since the substantially larger smoke particles will, on being ionized by the radium preparation, move through the correspondingly dimensioned electric field more slowly than ionized air particles. This causes the potential at the center point to be raised so that the cold cathode tube 7 is ignited. This in turn causes the relay 9 to pull up and, by way of example, to operate the fire alarm.

Figure 2:
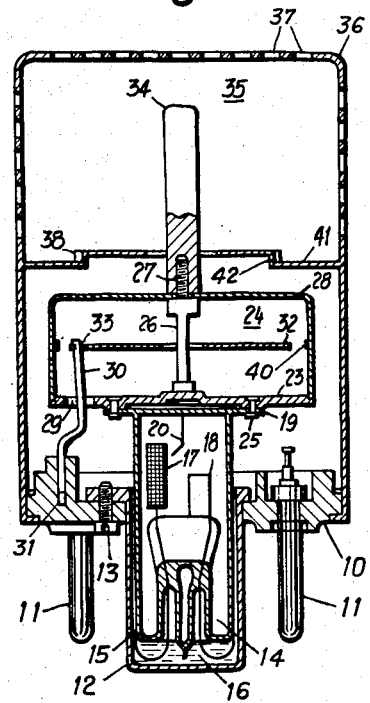
Fig. 2 shows the construction of the device according to a first embodiment of the invention.

Fig. 2 shows the structural unit 1 of Fig. 1 in greater detail. It comprises a base 10 in which, by way of example, two to four contact pins 11 are arranged. Downwardly projecting from the base is a metal cup 12 which may be provided with a projection (not shown) so that the proper correlation of the contacts is ensured when the unit is inserted in a counter-base. The cup 12 may be attached to the base 10 by means of screws 13.

Provided inside the cup 12 is a cold cathode tube 14 of which the tubular glass body 15 may be attached inside by means of a layer of putty 16. The cold cathode tube as usual comprises a cathode 17, and anode 18 and a control electrode 20. The glass body 15 extends beyond the edge of the cup 12 and is closed, in the embodiment shown, by a metal disk 19. The arrangement of the tube in a metal cup attached to the base entails the following advantages: firstly, it enables the critically important insulation of the projecting glass body to be measured; secondly, the tube can readily be replaced complete with the cup, and, thirdly, the cup can be connected for operation to a suitable potential.

The connections for the cathode 17 and the anode 18 are shown to be passed out of the tube on the underside and connected to the connecting terminals 11 via leads embedded in the putty.

The disc 19 is formed of a special alloy adapted to the glass so that it can be fused to the glass direct.

Arranged on the metallic disk 19 is the lower boundary 23 of the ionization chamber 24 which corresponds to the chamber 3 in the circuit diagram of Fig. 1. The lower boundary 23 may, by way of example, be connected to the disc 19 by means of three rivets 25.

The lower boundary plate 23 of the ionization chamber 24 carries a pin 26 which ends in a thread 27. Resting on a shoulder provided below the thread 27 is the cap shaped upper housing member 28 of the ionization chamber 24 which engages the outer edge of the closing plate 23. Bores 29 are further provided in this plate through which pins 30 extend (only one pin visible in Fig. 2) which are embedded in the base 10 by means of putty at 31.

The pins 30 support the second electrode 32 of the ionization chamber 24. Preferably bores 33 are provided in the electrode 32 which have a diameter larger than the pins 30. The edges of the bores 33 facing outwards are engaged by slots provided in the upper ends of the pins 30 so that the latter will hold the electrode 32 when appropriately mechanically pretensioned towards the outside. The radioactive preparation for the obtention of ionization in this chamber is preferably arranged at the lateral walls in the drawing, as e.g. indicated at 40.

The counterpart of screw 27 is formed by a pin 34 which holds the housing 28 on the one hand and serves as the electrode for the upper ionization chamber 35 on the other. The chamber 35 corresponds to chamber 4 of the circuit diagram of Fig. 1. The outer electrode of the ionization chamber 35 is formed by the jacket 36 enclosing the entire unit, which rests on the base 10 and is attached thereto. The jacket 36 is provided with a number of perforations 37 through which the outer air can enter chamber 35. The radioactive preparation for chamber 35 may be arranged on an intermediate wall 41 forming the lower boundary of the said chamber, as diagrammatically indicated at 38. The arrangement is preferably designed so that the preparation 38 is attached to a shoulder 42 of wall 41; the ionizing particles will thus travel mainly into the outer periphery of the chamber 35 as shown.

Besides the embodiment shown it is also possible to design the disk 19 direct as part of the ionization chamber 24. This dispenses with the riveted connection 25 so that the device is further simplified.

As is readily recognizable, the entire ionization chamber 24 and the electrode 34 of the ionization chamber 35 is carried by the tube. Attachment of these members to the tube ensures, on the one hand, the required mechanical rigidity and, on the other, the necessary effective insulation. In addition, the process of attaching the disc 19 to the glass body 15 is very simple so that waste does practically not occur. The radioactive preparation 40 is preferably divided and arranged in several points in the height of disc 32. This ensures that the particles causing ionization will be radiated normally to the electric field so that saturation current will be reached at relatively low voltages.

When the device disclosed is applied in locations subject to much dust and dirt, it may be advantageous to provide a closure which prevents dust from reaching the highly insulating portions of the tube and the closed ionization chamber. The device according to Fig. 3—of which the other members are designed as those in Fig. 2—has the closed ionization chamber 24 provided with a covering disc 39 which engages the intermediate wall 28 and thus closes the space outside the ionization chamber 24. The covering disc 39 consists of highly insulating, water-repellent material. The covering disc 39 is designed with an annular projection 43 which engages an annular member 44 projecting below the shoulder. The covering disc further preferably projects to the vicinity of the pin electrode 34. The described design and arrangement of the insulating covering disc enables the insulation to be preserved also when one surface of the disc is soiled.

Figure 3:
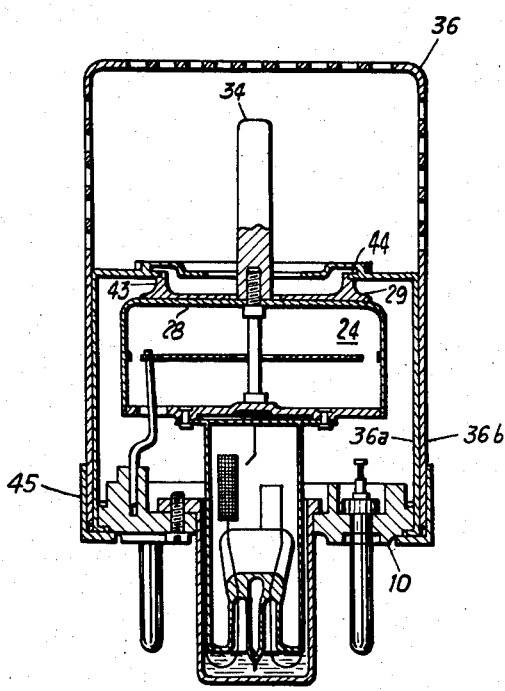
Fig. 3 shows a further embodiment of the invention.

In the embodiment of the invention according to Fig. 3, the jacket 36 is divided into two portions. An inner portion 36a is connected to the base 10 and closes together with the intermediate wall 28, while the second portion 36b encloses the said arrangement and is removably attached, as by a bayonet catch, to its counterpart 45, the latter resting on the lower side of the base. This design renders both chambers and the tube more easily accessible so that defective parts may be more readily replaced.

Having now particularly described and ascertained the nature of my said invention and in what manner the same is to be performed, I declare that what I claim is:

1. A device for the determination of changes in the composition of a gas, comprising a base of insulating material having contact pins connected therewith, a glow relay tube comprising a tubular glass body, a cathode, an anode and a control electrode, each of said anode and said cathode being electrically connected with one of said contact pins, said glow relay tube being connected with said base in an upright position, a metallic disc defining the upper end of said tubular glass body and being tightly connected therewith, said control electrode being connected with said disc and projecting into said tubular glass body, a first ionization chamber defined by a metallic housing connected with said disc and a second electrode arranged in said housing, pins attached to said base and electrically connected with one of said contact pins projecting through bores in said housing said bores communicating said first ionization chamber with the atmosphere whereby pressure variations in the latter are compensated and carrying said electrode in said housing of said first ionization chamber, a first radioactive substance arranged in said first ionization chamber and effecting free ions therein, a second ionization chamber defined by jacket mechanically connected with said base and electrically connected with one of said contact pins, said jacket being provided with bores to provide inlet openings for said gas, an inner electrode arranged in said jacket connected with the housing of said first ionization chamber to thereby provide an electrical connection between said inner electrode and said control electrode, a second radioactive substance arranged in said second ionization chamber and providing free ions therein, so that a voltage applied to said contact pins connected with said anode and said cathode and applied to said second electrode of said first ionization chamber and said jacket of said second ionization chamber will ignite said glow relay tube when the electric potential of said control electrode will change due to the aerosols contained in said gas entering said jacket and decreasing the current effected by said second radioactive substance and the voltage applied to said second electrode of said first ionization chamber and to said jacket.

2. A device according to claim 1, wherein the pins attached to said base are provided with an outwardly directed mechanical pretension to hold the inner electrode of the first ionization chamber, said pins having outwardly open slots arranged at their upper ends, said electrode being provided with bores having a diameter larger than that of the pins, so that the slots in the pins enclose the electrode at the outwardly located points of the enclosure of the bores, thereby holding the electrode.

3. A device according to claim 1, wherein said housing defining said first ionization chamber is formed of a plate and an upper cap-shaped housing member, said plate being attached to said metallic disc, said disc carrying a vertically projecting pin to which said cap-shaped housing member is attached by means of a screw connection, the counterpart of the screw being said inner electrode in said second ionization chamber.

4. A device according to claim 1, wherein the closed first ionization chamber and the relay tube are laterally closed by a cylindrical housing and above by an intermediate wall which forms the lower boundary of the second ionization chamber and is provided with an opening for the passage of the inner electrode of said second ionization chamber, a covering plate formed of a highly insulating material being provided on the first closed ionization chamber, the said plate engaging the intermediate wall so that the parts below the said plate are protected against soiling.

5. A device according to claim 1, wherein said glow relay tube is a cold cathode tube.

6. A device according to claim 1, wherein both ionization chambers have a circular cross-section and are arranged coaxially.

References Cited in the file of this patent

FOREIGN PATENTS 227,471    Switzerland _____ Sept. 1, 1943